(12) United States Patent
Ponnampalam

(10) Patent No.: US 8,761,283 B2
(45) Date of Patent: Jun. 24, 2014

(54) MIMO CHANNEL MATRIX FEEDBACK IN OFDM SYSTEMS

(75) Inventor: Vishakan Ponnampalam, San Jose, CA (US)

(73) Assignee: Mediatek Singapore Pte. Ltd., Singapore (SG)

(*) Notice: Subject to any disclaimer, the term of this patent is extended or adjusted under 35 U.S.C. 154(b) by 29 days.

(21) Appl. No.: 13/635,240

(22) PCT Filed: Oct. 7, 2011

(86) PCT No.: PCT/US2011/055203
§ 371 (c)(1),
(2), (4) Date: Sep. 14, 2012

(87) PCT Pub. No.: WO2012/051058
PCT Pub. Date: Apr. 19, 2012

(65) Prior Publication Data
US 2013/0010889 A1 Jan. 10, 2013

Related U.S. Application Data

(60) Provisional application No. 61/391,787, filed on Oct. 11, 2010.

(51) Int. Cl.
*H04K 1/10* (2006.01)
*H04L 27/28* (2006.01)

(52) U.S. Cl.
USPC ........... 375/260; 375/346; 375/267; 375/299; 375/347; 455/501; 455/63.1; 455/114.2; 370/208; 370/210

(58) Field of Classification Search
CPC ..... H04L 27/2647; H04L 1/20; H04L 5/0007; H04L 27/2657; H04L 27/2662; H04L 5/0048; H04L 1/0618; H04L 1/06; H04L 25/0204; H04L 1/0071; H04B 1/1027; H04B 1/123; H04B 1/1036; H04B 7/0417; H04B 7/0669; H04B 7/0845; H04B 7/0854; H04B 7/0857
USPC ............ 375/346, 260, 267, 299, 347; 455/24, 455/501, 63.1, 114.2; 370/208, 210
See application file for complete search history.

(56) References Cited

U.S. PATENT DOCUMENTS 7,649,955 B2 * 1/2010 Lin et al. .................. 375/267
2007/0115799 A1 5/2007 Ting et al.
(Continued)

OTHER PUBLICATIONS

International Search Report and Written Opinion mailed Jan. 23, 2012.

*Primary Examiner* — Phuong Phu
(74) *Attorney, Agent, or Firm* — McClure, Qualey & Rodack, LLP

(57) ABSTRACT

A method of reporting channel state information (CSI) with reduced feedback overhead in a MIMO-OFDM system is provided. A receiver first estimates CSI of a multiple-input multiple-output (MIMO) channel based on a sounding signal transmitted from a transmitter. The CSI comprises L channel response matrices, and each matrix corresponds to an OFDM tone in the MIMO channel. Each channel response matrix is then decomposed into a first CSI component and a second CSI component. The receiver selects a first subset of the first CSI component based on a first tone group size and a second subset of the second CSI component based on a second tone group size. Finally, the receiver transmits the selected subsets of the first and the second CSI components to the transmitter. The reduced feedback does not have significant loss in the information content of CSI because of the coherent bandwidth in typical OFDM systems.

18 Claims, 3 Drawing Sheets

(56) References Cited

U.S. PATENT DOCUMENTS

| | | |
|---|---|---|
| 2008/0317141 A1 | 12/2008 | Burg et al. |
| 2010/0166100 A1 | 7/2010 | Medvedev et al. |
| 2013/0188677 A1 * | 7/2013 | Howard et al. ............... 375/219 |

* cited by examiner

US 8,761,283 B2

MIMO CHANNEL MATRIX FEEDBACK IN OFDM SYSTEMS

CROSS REFERENCE TO RELATED APPLICATIONS

This application is the 35 U.S.C. §371 national stage of, and claims priority to and the benefit of, PCT application PCT/US2011/055203, filed Oct. 7, 2011, which claims priority to and the benefit of U.S. Provisional Application No. 61/391,787, filed on Oct. 11, 2010, herein incorporated by reference in its entirety.

TECHNICAL FIELD

The disclosed embodiments relate generally to transmitter and receiver design, and, more particularly, to a method of signaling Channel State Information (CSI) for Multiple-Input Multiple-Output (MIMO) precoding in Orthogonal Frequency Division Multiplexing (OFDM) systems.

BACKGROUND

The use of multiple antennas at both the transmitter and receiver of a wireless communication system along with related baseband signal processing is referred to as Multiple-Input Multiple-Output (MIMO) technology. MIMO can provide two forms of gains: multiplexing gain and diversity gain. Spatial multiplexing gain is more suited for the high Signal-to-Noise Ratio (SNR) scenario. In this case, multiple independent data streams are separated only in the spatial domain, but otherwise occupying the same temporal and frequency resources. The receiver employs multiple receive antennas and baseband signal processing to separate these data streams, which are combined by the radio channel. Diversity gain, on the other hand, is realized by transmitting identical information separated in the spatial domain (e.g. on different transmit antenna) which improves the robustness of the transmission. Diversity gains are beneficial when the receiver experiences low Signal-to-Noise Ratio (SNR) due to severe propagation loss, multi-user interference etc.

MIMO technology can be applied to transmit from a single transmitting station to a single receiving station. This scenario is known as Single-User (SU) MIMO. Alternatively, MIMO technology may be applied to transmit from one transmitting station to multiple receiving stations. This application is known as Multi-User (MU) MIMO or MIMO Broadcast. In a MU-MIMO system, precoding is applied at the transmitter in order to suppress mutual interference experienced by each receiving station caused by transmissions to other receiving stations. To those skilled in the art, MU-MIMO precoding, refers to spatial encoding of the transmitted signal based on propagation channel.

In order to apply MU-MIMO precoding, the transmitting station is required to know the Channel State Information (CSI) of the radio channels connecting it to each of the receiving stations for transmission. It is possible, in theory, for the transmitting station to directly measure required CSIs in Time Division Duplex (TDD) systems. Due to practical limitations, however, such as the lack of calibration between transmitting and receiving RF chains, the transmitting station is generally unable to directly measure the CSIs. Consequently, it is common to require the receiving stations to measure the CSIs and feed this information back to the transmitting station via a feedback channel. The content of the CSI feedback information is related to the amount of multipath dispersion of the channel relative to the transmission bandwidth. In addition, the CSI feedback information varies continually due to relative motion between the transmitting and receiving stations and other environmental changes such as human movement. Therefore, the CSI feedback information needs to be updated regularly. In a typical wireless system consisting of multiple stations, this CSI feedback requirement amounts to very significant signaling overhead.

SUMMARY

A method of reporting channel state information (CSI) with reduced feedback overhead in a MIMO-OFDM system is provided. A receiver first estimates CSI of a multiple-input multiple-output (MIMO) channel based on a sounding signal transmitted from a transmitter. The CSI comprises L channel response matrices, and each matrix corresponds to an OFDM tone in the MIMO channel. Each channel response matrix is then decomposed into a first CSI component and a second CSI component. The receiver determines a first subset of the first CSI component based on a first tone group size $N_{G1}$ and a second subset of the second CSI component based on a second tone group size $N_{G2}$. Finally, the receiver transmits the determined subsets of the first and the second CSI components to the transmitter. The transmitter receives the reduced CSI feedback information, and obtains the non-reported channel response matrices by interpolating between the reported channel response matrices.

In one embodiment, the channel response matrices $H_l$ for each OFDM tone are decomposed into unitary matrices $V_l$ and diagonal matrices $\Sigma_l$. The eigen matrices $V_l$ form the first CSI component, and one eigen matrix is determined for every consecutive $N_{G1}$ tones with a first group size $N_{G1}$. The diagonal matrices $\Sigma_l$ form the second CSI component, and one diagonal matrix is determined for every consecutive $N_{G2}$ tones with a second group size $N_{G2}$. In general, the proper tone group size may be selected based on the coherent bandwidth of the channel, which is closely related to the delay spread of the channel. The tone group sizes may be determined by the receiver, the transmitter, or predefined by the system. In one example, $N_{G2}=2*N_{G1}$. Because of the relatively larger coherent bandwidth of the MIMO channel in typical OFDM systems as compared to the tone bandwidth, only a subset of CSI is reported back to the transmitting station. Such feedback scheme with reduced feedback overhead does not incur significant loss in the information content of CSI, and thus does not suffer significant performance degradation of pre-coded MU-MIMO.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

A multiple-input multiple-output (MIMO) wireless system employs multiple ($N_T$) transmit antennas and multiple ($N_R$) receive antennas for data transmission. Via spatial multiplexing, a MIMO channel formed by the $N_T$ transmit and $N_R$ receive antennas may be decomposed into $N_S$ spatial channels, where $N_S <= \min\{N_T, N_R\}$. The $N_S$ spatial channels are used to transmit $N_S$ independent data streams to achieve greater overall throughput. Spatial multiplexing can be combined with diversity coding when decoding reliability is in trade-off. While single-user MIMO (SU-MIMO) considers access to the multiple antennas that are physically connected to each individual terminal (e.g., user), multi-user MIMO (MU-MIMO) allows a terminal to transmit (or receive) signals to (or from) multiple users simultaneously.

In a MU-MIMO system, precoding is applied at a transmitting station in order to suppress mutual interference experienced by each receiving station caused by transmissions to other receiving stations. To those skilled in the art, MU-MIMO precoding, refers to spatial encoding of the transmitted signal based on propagation channel. In order to apply MU-MIMO precoding, the transmitting station is required to know the Channel State Information (CSI) of the radio channels connecting it to each of the receiving stations for transmission. CSI refers to known channel properties and needs to be estimated at the receiver. In order to avoid assumptions regarding reciprocal uplink and downlink channels, CSI is provided to the transmitting station by the receiving station via a feedback channel.

Figure 1:
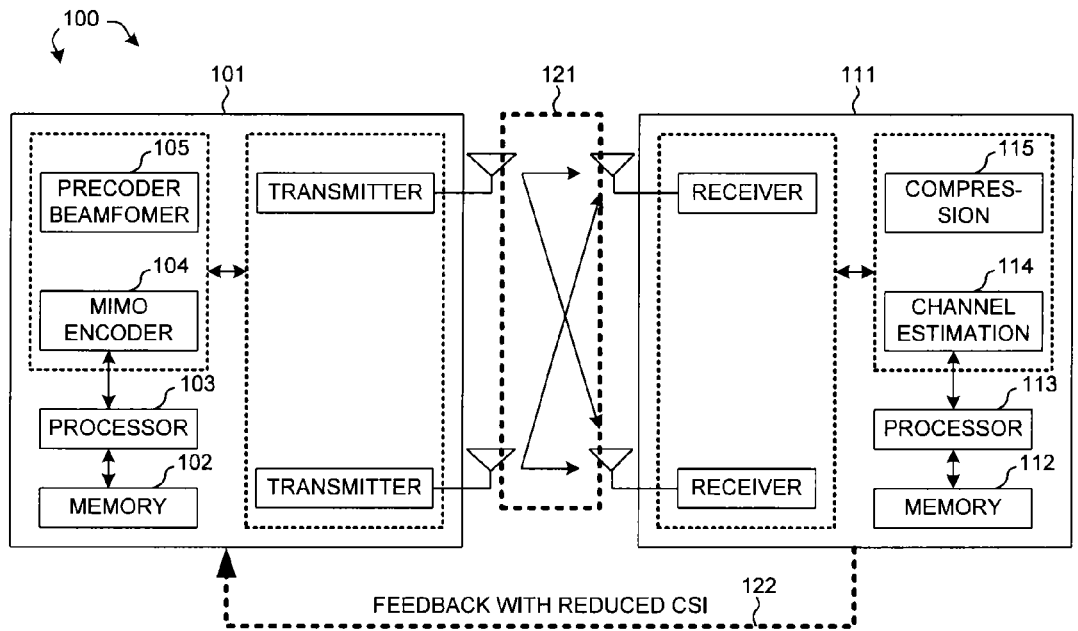
FIG. 1 illustrates simplified block diagrams of a transmitting station and a receiving station in a multiple-input multiple-output (MIMO) wireless system in accordance with one novel aspect.

FIG. 1 illustrates simplified block diagrams of a transmitting station 101 and a receiving station 111 in a MIMO wireless system 100 in accordance with one novel aspect. Transmitting station 101 comprises memory 102, a processor 103, a MIMO encoder 104, a beamformer/precoder 105, and a plurality of transmitters coupled to a plurality of antennas, respectively. Receiving station 111 comprises memory 112, a processor 113, a channel estimation module 114, a compression module 115, and a plurality of receivers coupled to a plurality of antennas, respectively. A MIMO channel 121 is formed by the plurality of transmitting antennas (e.g., antennas of transmitting station 101) and the plurality of receiving antennas (e.g., antennas of receiving station 111 and antennas of other receiving stations (not shown)). Those skilled in the art would realize that "antenna" is used in a logical context, and may not necessarily be referred to as the physical antenna structure.

At the receiver side, the channel estimation module 114 of receiving station 111 estimates the CSI of MIMO channel 121 through channel sounding. The CSI is then provided to the transmitting station 101 via a feedback channel 122. Based on the CSI feedback information, transmitting station 101 performs MU-MIMO beamforming (precoding) and simultaneously transmits multiple spatial streams to multiple users including receiving station 111. With proper transmit beamforming (precoding), spatial processing is done at the transmitting station to separate the spatial streams among the multiple users, and the remaining spatial processing is done at the receiving stations to decode the multiple spatial streams received. In one novel aspect, the CSI is compressed by compression module 115, and compressed CSI feedback information is provided with reduced feedback overhead without sacrificing significant MU-MIMO precoding performance.

A downlink MIMO channel formed by $N_T$ antennas at the transmitter and $N_R$ antennas at the receiver may be characterized by a channel response matrix H consists of $N_R$ rows and $N_T$ columns. To perform MU-MIMO precoding, the transmitter uses CSI to adapt its signal to create a diagonalized channel. One method of adapting the signal includes singular value decomposition (SVD) of the channel response matrix H. The singular value decomposition of H may be expressed as:

$$H = U \cdot \Sigma \cdot V^* \qquad \text{Eq. (1)}$$

where
U is a unitary matrix of left eigenvectors of H
$\Sigma$ is a diagonal matrix of singular values of H
V is a unitary matrix of right eigenvectors of H, V* denotes the conjugate transpose of V A unitary matrix Q is characterized by the property Q*Q=I, where I is the identity matrix. The columns of a unitary matrix are orthogonal to one another, and each column has unit power. The right eigenvectors in V may be used to determine the precoding matrix W for spatial processing to transmit data on the eigenmodes of H. The diagonal matrix $\Sigma$ contains non-negative real values along the diagonal and zeros elsewhere. These diagonal entries are referred to as singular values of H, and represent the channel gains for the eigenmodes.

Figure 2:
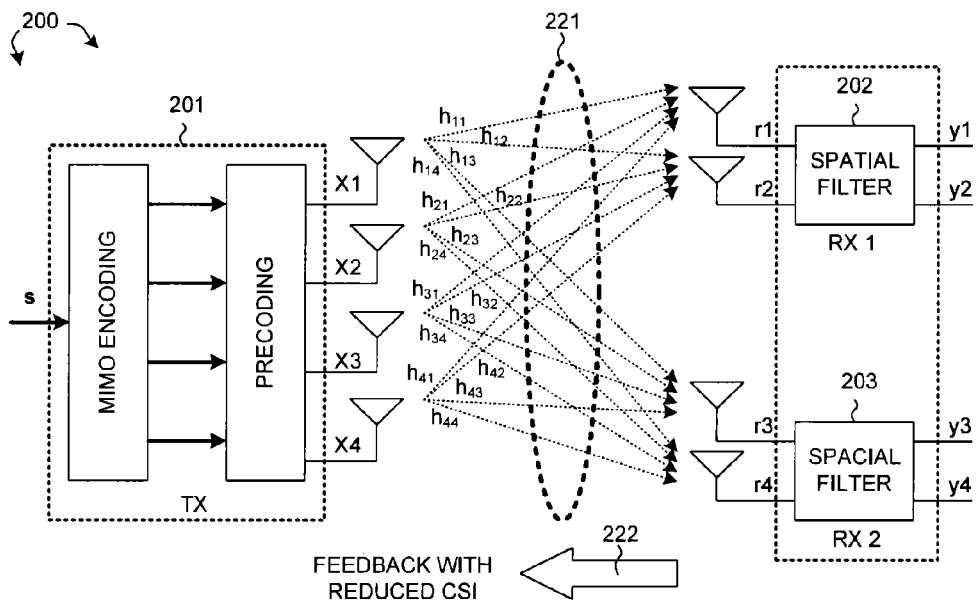
FIG. 2 illustrates a simplified diagram of a multi-user MIMO channel in a MU-MIMO wireless system in accordance with one novel aspect.

FIG. 2 illustrates a simplified diagram of a MU-MIMO channel 221 in a wireless communication system 200. Wireless system 200 comprises a transmitting station 201, a first receiving station 202, and a second receiving station 203. In the example of FIG. 2, four spatial streams are transmitted by the TX antennas with two spatial streams intended for each receiving station. The channel response matrix H of MIMO channel 221 consists of four rows and four columns of channel coefficients. The coefficients $h_{11}$, $h_{12}$, $h_{13}$, and $h_{14}$ represent the transmission from $Tx_1$ antenna arriving at $Rx_1$, $Rx_2$, $Rx_3$, and $Rx_4$ antennas. The coefficients $h_{21}$, $h_{22}$, $h_{23}$, and $h_{22}$ represent the transmission from $Tx_2$ antenna arriving at $Rx_1$, $Rx_2$, $Rx_3$, and $Rx_4$ antennas. The coefficients $h_{31}$, $h_{32}$, $h_{33}$, and $h_{32}$ represent the transmission from $Tx_3$ antenna arriving at $Rx_1$, $Rx_2$, $Rx_3$, and $Rx_4$ antennas. Finally, the coefficients $h_{41}$, $h_{42}$, $h_{43}$, and $h_{42}$ represent the transmission from $Tx_4$ antenna arriving at $Rx_1$, $Rx_2$, $Rx_3$, and $Rx_4$ antennas. The transmission from each of the four TX antennas arrives at each of the four RX antennas. The input-output relationship can be described as:

$$x = Ws \qquad \text{Eq. (2)}$$

$$r = Hx + n \qquad \text{Eq. (3)}$$

$$y = Fr \qquad \text{Eq. (4)}$$

where
s is a vector of input data symbols
x is a vector with $N_T$ transmit symbols to be sent from the $N_T$ antennas after applying precoding matrix W, which is derived from V and/or $\Sigma$
r is a vector with $N_R$ received symbols from the $N_R$ antennas through a MIMO channel with channel response matrix H
n is a noise vector
y is a vector of output data symbols after applying spatial filter matrix F Thus, the combination of precoding the signal vector s with precoding matrix W at the transmitter, and spatial filtering the received signal vector r with spatial filter matrix F at the receiver results in the effective diagonal channel. Due to the precoding applied at the transmitter, signals received at each receiving station have minimal interference or, ideally, is free of interference from signals intended for other users. This allows for relatively simple processing at the receiver to achieve good performance. In order to apply MU-MIMO precoding via SVD, the transmitting station is required to have either knowledge of the right eigen matrix V or knowledge of both V and Σ. This requires the receiving stations to feedback the right eigen matrix and/or the singular values to the transmitting station. Such feedback requirement imposes significant overhead, especially for MIMO-OFDM systems. In one novel aspect, a CSI feedback scheme with reduced CSI is applied in MIMO-OFDM systems described below with more details (e.g., feedback with reduced CSI via feedback channel 222).

Orthogonal Frequency Division Multiplexing (OFDM) is widely used for data modulation in modern communication systems, due to its inherent robustness to wideband fading. OFDM effectively converts a wide bandwidth channel in to a set of sub-channels of narrow bandwidth, which are used to transmit information. These sub-channels are referred to as subcarriers or OFDM tones. In the presences of multipath in the radio propagation channel, each tone experiences narrow band fading. A MIMO system employing OFDM applies precoding on a tone-by-tone basis. In a MIMO system consisting of L tones, the CSI between a pair of transmitting and receiving stations can be represented as a set of L complex valued matrices $\{H_l\}$, where $H_l$ denotes the MIMO channel response matrix for the l-th tone.

Figure 3:
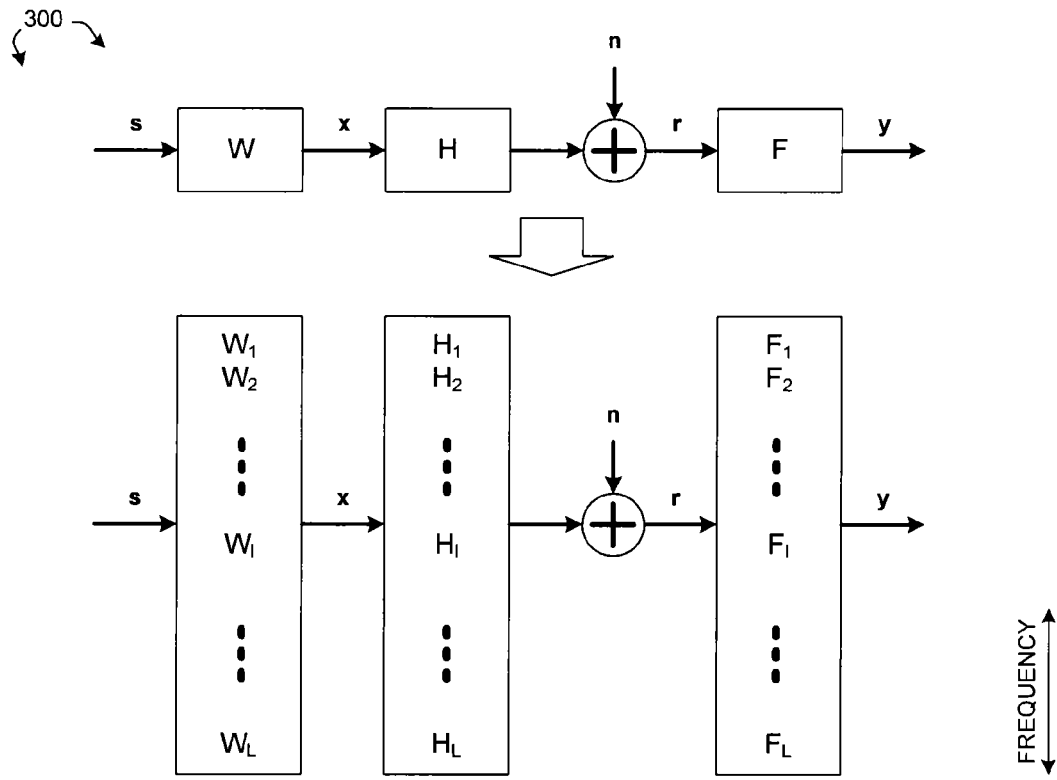
FIG. 3 illustrates the channel response matrix H in a MIMO-OFDM channel with L OFDM tones in a wireless communication system.

FIG. 3 illustrates the channel response matrix H of a MIMO-OFDM channel with L OFDM tones in a wireless communication system 300. In the example of FIG. 3, the channel response matrix H is represented as a set of L complex valued matrices $H_1, H_2, H_3, \ldots, H_L$, where $H_l$ denotes the MIMO channel response matrix corresponding to the l-th tone. MIMO-OFDM system 300 applies precoding on a tone-by-tone basis. For each tone, the input signal vector s is applied with precoding matrix $W_l$ at the transmitter, and the received signal vector r is applied with spatial filter matrix $F_l$ at the receiver. Each channel response matrix $H_l$ can be decomposed, using SVD, into a set of three matrices $U_l, \Sigma_l$, and $V_l$ such that:

$$H_l = U_l \cdot \Sigma_l \cdot V_l^* \quad \text{Eq. (5)}$$

where $U_l$ and $V_l$ are unitary matrices, known as the left and right eigen matrices, $V_l^*$ denotes the conjugate transpose of $V_l$ $\Sigma_l = \text{diag}(\sigma_l^{(1)}, \sigma_l^{(2)}, \ldots, \sigma_l^{(N)})$, where $\sigma_l^{(n)}$ denotes the singular value corresponding to the n-th spatial stream Typical OFDM systems are designed such that the coherent bandwidth of the radio channel it is deployed in is significantly larger than the tone bandwidth, i.e., the frequency separation between adjacent tones. As a result, the MIMO channels corresponding to adjacent tones are significantly correlated. In one novel aspect, the receiving station only needs to report a subset of MIMO channel response matrices, generally equally spaced across the transmission bandwidth without significant loss in the information content of CSI. This technique is referred to as "tone grouping". The MIMO channel response matrices corresponding to the tones not reported can be derived, by the transmitter, by interpolating between the MIMO channel response matrices that are reported.

Figure 4:
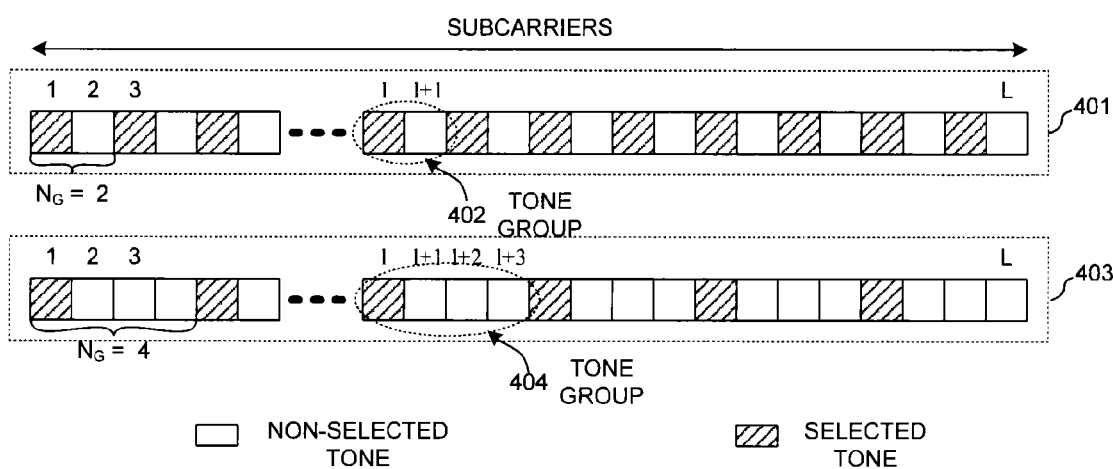
FIG. 4 illustrates the concept of tone grouping to be applied in a novel CSI feedback scheme with reduced feedback information.

FIG. 4 illustrates the concept of tone grouping to be applied in a novel CSI feedback scheme with reduced feedback overhead. Consider a MIMO system consisting of L OFDM tones, each OFDM tone is represented by a box. Under the concept of tone grouping, the L subcarriers are grouped into groups of tones. Each tone group consists of $N_G$ contiguous tones, where $N_G$ is referred to as the tone group size. For the top L OFDM tones 401, the tone group size $N_G=2$, meaning every two consecutive tones are grouped into one tone group, e.g., tone group 402. For the bottom L OFDM tones 403 the tone group size $N_G=4$, meaning every four consecutive tones are grouped into one tone group, e.g., tone group 404.

Under the concept of tone grouping, the consecutive tones within the same tone group are significantly correlated. For example, for tone group 402, the channel response matrix $H_l$ and $H_{l+1}$ for the l-th tone and the (l+1)-th tone are substantially correlated. Likewise, for tone group 404, the channel response matrix $H_l, H_{l+1}, H_{l+2}$, and $H_{l+3}$ for the l-th tone, the (l+1)-th tone, the (l+2)-th tone, and the (l+3)-th tone are substantially correlated. To reduce feedback overhead, the channel response matrix for one tone is determined from each tone group by the receiver and reported to the transmitter, and the channel response matrices for the remaining tones in the same tone group are not reported to the transmitter. In the example of FIG. 4, if $N_G=2$, then one tone is selected (depicted by slashed shade) from each tone group of two consecutive tones. Similarly, if $N_G=4$, then one tone is selected (depicted by slashed shade) from each tone group of four consecutive tones. The receiving station feeds back the MIMO channel response matrices for only the selected tones in each tone group, e.g., the MIMO channel response matrices for the $1^{st}, 3^{rd}, 5^{th} \ldots$ selected tones if group size $N_G=2$, or the MIMO channel response matrices for the $1^{st}, 5^{th}, 9^{th} \ldots$ selected tones if group size $N_G=4$. The transmitting station receives the reduced CSI feedback information, and obtains the non-reported MIMO channel response matrices by interpolating between the reported MIMO channel response matrices.

Because the MIMO channel response matrix $H_l$ for the l-th tone can be decomposed into a set of three matrices $U_l, \Sigma_l$, and $V_l$, using SVD, the right eigen matrix $V_l$ and/or the diagonal matrix $\Sigma_l$ may be reported by the receiver to the transmitter using the novel tone-grouping concept. That is, a subset of $V_l$ and/or $\Sigma_l$ is determined by the receiver based on a certain tone group size and reported to the transmitter. In general, under a given tone group size $N_G$, one $V_l$ and/or $\Sigma_l$ for one tone is derived from the $N_G$ $V_l$ and/or $\Sigma_l$ for the $N_G$ consecutive tones in each tone group. There may be different derivation methods. For example, if $N_G=4$, then one $V_l$ and/or $\Sigma_l$ may be derived based on an average or other linear/non-linear relationship of the four $V_l$s and/or $\Sigma_l$s for the four tones in each tone group and reported to the transmitter. In one specific example, one $V_l$ and/or $\Sigma_l$ for one tone in each tone group is selected from each tone group to be reported to the transmitter, as illustrated in FIG. 4.

The performance of pre-coded MU-MIMO systems is closely related to the tone group size. If the tone group size is as small as one, then no performance degradation and no compression is achieved to reduce the CSI feedback overhead. As the tone group size increases, the system performance degrades with reduced CSI feedback overhead. In general, the proper tone group size may be selected based on the coherent bandwidth of the channel, which is closely related to the delay spread of the channel. For example, if the delay spread is less than a couple of hundred nanoseconds, then the tone group size may be as large as $N_G=4$ without significant loss in the information content of CSI. When the delay spread increases, the tone group size may be reduced to two or even one. The tone group size $N_G$ may be determined by different methods. In one example, $N_G$ is determined by the receiving station based on the delay spread of the channel. In another example, $N_G$ is determined by the transmitting station. In yet another example, $N_G$ is predefined by the system and known to both transmitter and receivers.

It is further observed that, the performance of pre-coded MU-MIMO systems is significantly more sensitive to errors in the precoding V matrices as compared to errors of the singular values in the $\Sigma$ matrices. Moreover, interpolation between singular values in $\Sigma$ is significantly easier to perform with a high degree of precision as compared to interpolation between sets of V matrices having complex numbers. Based on the above observation, in one advantageous aspect, it is proposed that a larger tone group size can be applied to the set of $\Sigma$ matrices relative to the set of V matrices. Referring back to FIG. 4, group size $N_{GV}=2$ for top L OFDM tones 401 is applied to the V matrices, while group size $N_{G\Sigma}=4$ for bottom L OFDM tones 403 is applied to the $\Sigma$ matrices. In one embodiment, $N_{GV}$ and $N_{G\Sigma}$ are selected from a predefined set of number pairs. In one specific example, $N_{G\Sigma}=2*N_{GV}$.

To those skilled in the art, it would be obvious that unitary matrix $V_l$ can be represented compactly. For example, $V_l$ can be represented as a series of Given Rotations, denoted as a sequence of angles. Such representations require less number of bits to represent relative to the straightforward representation as a series of complex numbers corresponding to the elements of the matrix. While representing unitary matrix $V_l$ using a sequence of angles reduces feedback overhead, unitary matrix $V_l$ may be reported using the above illustrated tone-grouping scheme, which further reduces feedback overhead. For example, a two-by-two $V_l$ matrix may be represented by a sequence of three angles $[\theta 1, \theta 2, \theta 3]_l$. Because $\theta 1$ is more important to the performance of pre-coded MU-MIMO system, $\theta 1$ is thus reported for every tone, e.g., with $N_{G\theta 1}=1$, while $\theta 2$ and $\theta 3$ are reported for every other tones, e.g., with $N_{G\theta 2}=2$.

As described earlier, $\Sigma_l$ is a diagonal matrix consisting of singular values of the MIMO channel matrix $H_l$. Thus, the diagonal elements of $\Sigma_l$ are non-negative real numbers, and all other elements of $\Sigma_l$ have a value of zero. It would be obvious to those skilled in the art that the diagonal elements of $\Sigma_l$ may be reported after squaring and normalization with an arbitrary scaling factor. For example, squared singular values, normalized by the noise variance that corresponds to the Signal to Noise Ratio (SNR) per spatial stream may be reported instead of the singular values. Similar to the $V_l$ matrices, the $\Sigma_l$ matrices may also be reported using the concept of tone-grouping to further reduce feedback overhead. For example, a two-by-two $\Sigma_l$ matrix may be represented by two singular values $[\sigma_l^{(1)}, \sigma_l^{(2)}]$. Because $\sigma 1$ is more important to the performance of pre-coded MU-MIMO system, $\sigma 1$ is thus reported for every tone, e.g., with $N_{G\sigma 1}=1$, while $\sigma 2$ is reported for every other tones, e.g., with $N_{G\sigma 2}=2$.

Figure 5:
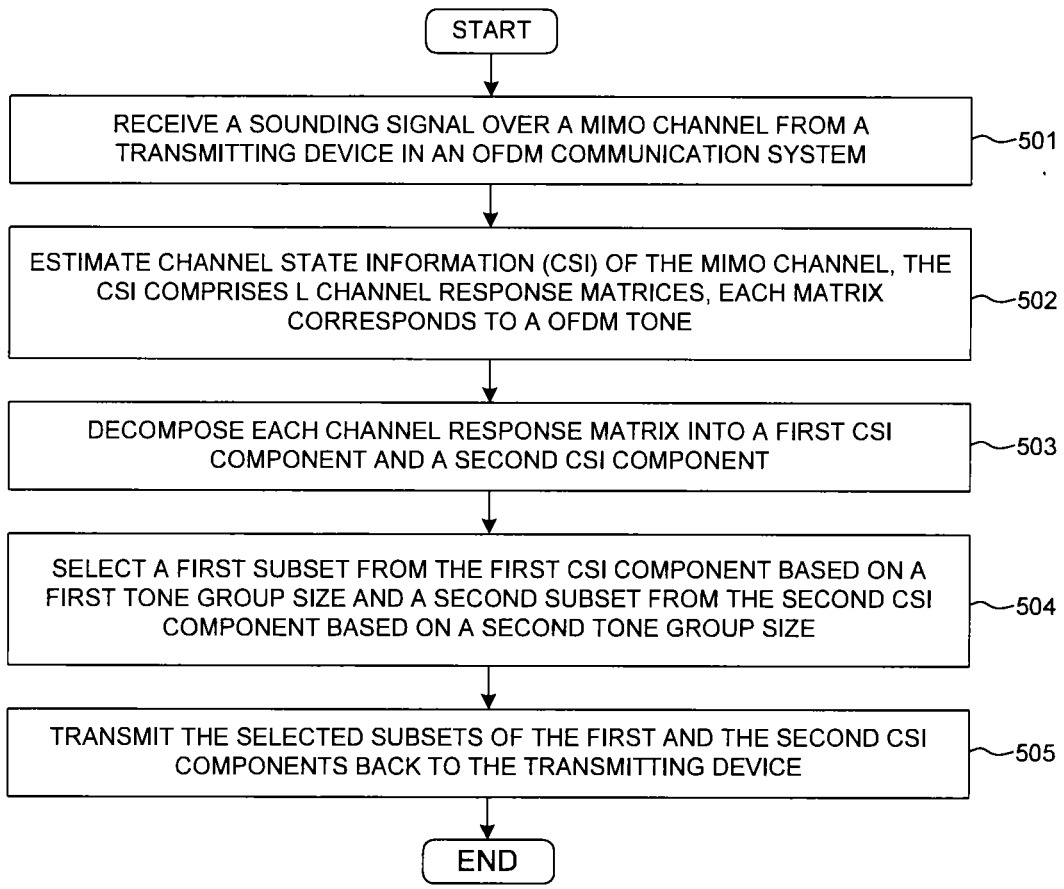
FIG. 5 is a flow chart of a method of providing CSI with reduced feedback overhead in a MIMO-OFDM system in accordance with one novel aspect.

FIG. 5 is a flow chart of a method of providing CSI with reduced feedback overhead in a MIMO-OFDM system in accordance with one novel aspect. In step 501, a receiving station receives a sounding signal over a MIMO channel from a transmitting station in an OFDM communication system. In step 502, the receiver estimates the channel station information (CSI) of the MIMO channel based on the sounding signal. The CSI comprises L channel response matrices, and each matrix corresponds to an OFDM frequency tone. In step 503, the receiver decomposes each channel response matrix into a first CSI component and a second CSI component. In step 504, the receiver selects a first subset from the first CSI component based on a first tone group size and a second subset from the second CSI component based on a second tone group size. In one embodiment, the channel response matrices are decomposed into right eigen matrices $V_l$ and diagonal matrices $\Sigma_l$. The right eigen matrices $V_l$ form the first CSI component, and one right eigen matrix is selected for every consecutive $N_{G1}$ tones with a first group size $N_{G1}$. The diagonal matrices $\Sigma_l$ form the second CSI component, and one diagonal matrix is selected for every consecutive $N_{G2}$ tones with a second group size $N_{G2}$. The group sizes may be determined by the receiver, the transmitter, or predefined by the system. In one example, $N_{G2}=2*N_{G1}$. In step 505, the selected subsets of the first and the second CSI components are provided back to the transmitting station. Because of the relatively larger coherent bandwidth of the MIMO channel in OFDM systems as compared to the tone bandwidth, only a subset of CSI is reported back to the transmitting station. Such feedback scheme with reduced feedback overhead does not incur significant loss in the information content of CSI, and thus does not suffer significant performance degradation of pre-coded MU-MIMO. In one embodiment, the OFDM system may be an IEEE 802.11ac system.

In one or more exemplary embodiments, the functions described may be implemented in hardware, software, firmware, or any combination thereof. If implemented in software, the functions may be stored on or transmitted over as one or more instructions or code on a computer-readable (processor-readable) medium. Computer-readable media include both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that both can be used to carry or store desired program code in the form of instructions or data structures, and can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and blue-ray disc where disks usually reproduce data magnetically, while discs reproduce data optically with lasers. Combinations of the above should also be included within the scope of computer-readable media.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   (a) determining channel state information (CSI) of a multiple-input multiple-output (MIMO) channel by a receiver in a Orthogonal Frequency Division Multiplexing (OFDM) communication system, wherein the MIMO channel comprises L frequency tones, and wherein the CSI comprises L channel response matrices, each matrix corresponds to an OFDM tone;

(b) decomposing each channel response matrix into a first CSI component and a second CSI component;

(c) determining a first subset of the first CSI component based on a first tone group size $N_{G1}$ and a second subset of the second CSI component based on a second tone group size $N_{G2}$; and (d) transmitting the determined subsets of the first and the second CSI components to a transmitter;

wherein the first CSI component comprises a plurality of unitary right eigenvector matrices V, the second CSI component comprises a plurality of diagonal singular value matrices $\Sigma$, and the determining in (c) involves determining one $\Sigma$ matrix for every $N_{G2}$ OFDM tones.

2. The method of claim 1, wherein the decomposing in (b) involves applying Singular Value Decomposition (SVD) to each channel response matrix into L unitary right eigenvector matrices $V_1$-$V_L$, and L diagonal singular value matrices $\Sigma_1$-$\Sigma_L$.

3. The method of claim 2, wherein the determining in (c) involves determining one V matrix for every $N_{G1}$ OFDM tones.

4. The method of claim 2, wherein $N_{G2}$ is twice the size of $N_{G1}$.

5. The method of claim 2, wherein each V matrix is represented by a series of angles, wherein the first CSI component comprises a first angle of each V matrix, and wherein the second CSI component comprises a second angle of each V matrix.

6. The method of claim 2, wherein each $\Sigma$ matrix is represented by a series of real numbers, wherein the first CSI component comprises a first real number of each $\Sigma$ matrix, and wherein the second CSI component comprises a second real number of each $\Sigma$ matrix.

7. The method of claim 1, wherein $N_{G1}$ and $N_{G2}$ are determined either by the receiver or by the transmitter.

8. The method of claim 1, wherein $N_{G1}$ and $N_{G2}$ are determined from a set of predefined number pairs.

9. A device, comprising:

a channel estimation module that determines channel state information (CSI) of a multiple-input multiple-output (MIMO) channel in a Orthogonal Frequency Division Multiplexing (OFDM) communication system, wherein the MIMO channel comprises L frequency tones, and wherein the CSI comprises L channel response matrices, each matrix corresponds to a OFDM tone;

a compression module that decomposes each channel response matrix into a first CSI component and a second CSI component, wherein the first CSI component comprises a plurality of unitary right eigenvector matrices V, the second CSI component comprises a plurality of diagonal singular value matrices $\Sigma$, and the compression module determines a first subset of the first CSI component based on a first tone group size $N_{G1}$ and a second subset of the second CSI component based on a second tone group size $N_{G2}$, the compression module further determines one $\Sigma$ matrix for every $N_{G2}$ OFDM tones; and a transmitter that transmits the determined subsets of the first and the second CSI components to another device.

10. The device of claim 9, wherein the compression module applies Singular Value Decomposition (SVD) to each channel response matrix into L unitary right eigenvector matrices $V_1$-$V_L$, and L diagonal singular value matrices $\Sigma_1$-$\Sigma_L$.

11. The device of claim 10, wherein the compression module determines one V matrix for every $N_{G1}$ OFDM tones.

12. The device of claim 10, wherein $N_{G2}$ is twice the size of $N_{G1}$.

13. The device of claim 9, wherein $N_{G1}$ and $N_{G2}$ are determined either by the receiver or by the transmitter.

14. The device of claim 9, wherein $N_{G1}$ and $N_{G2}$ are determined from a set of predefined number pairs.

15. A non-transitory computer-readable medium storing instructions that, when executed by a processor, cause the processor to perform a method, the method comprising:

(a) determining channel state information (CSI) of a multiple-input multiple-output (MIMO) channel by a receiver in a Orthogonal Frequency Division Multiplexing (OFDM) communication system, wherein the MIMO channel comprises L frequency tones, and wherein the CSI comprises L channel response matrices, each matrix corresponds to a OFDM tone;

(b) decomposing each channel response matrix into a first CSI component and a second CSI component;

(c) determining a first subset of the first CSI component based on a first tone group size $N_{G1}$ and a second subset of the second CSI component based on a second tone group size $N_{G2}$; and (d) transmitting the determined subsets of the first and the second CSI components to a transmitter;

wherein the first CSI component comprises a plurality of unitary right eigenvector matrices V, the second CSI component comprises a plurality of diagonal singular value matrices $\Sigma$, and the determining in (c) involves determining one $\Sigma$ matrix for every $N_{G2}$ OFDM tones.

16. The non-transitory computer-readable medium of claim 15, wherein the decomposing in (b) involves applying Singular Value Decomposition (SVD) to each channel response matrix into L unitary right eigenvector matrices $V_1$-$V_L$, and L diagonal singular value matrices $\Sigma_1$-$\Sigma_L$.

17. The non-transitory computer-readable medium of claim 16, wherein the determining in (c) involves determining one V matrix for every $N_{G1}$ OFDM tones.

18. The non-transitory computer-readable medium of claim 16, wherein $N_{G2}$ is twice the size of $N_{G1}$.

* * * * *